U. BACHMAN.
DREDGER.
APPLICATION FILED NOV. 10, 1914. RENEWED APR. 10, 1918.

1,291,635.

Patented Jan. 14, 1919.
9 SHEETS—SHEET 1.

WITNESSES:
Charles Pickles
Thos. Castberg

INVENTOR
Ulrich Bachman,
BY G. H. Strong
ATTORNEY

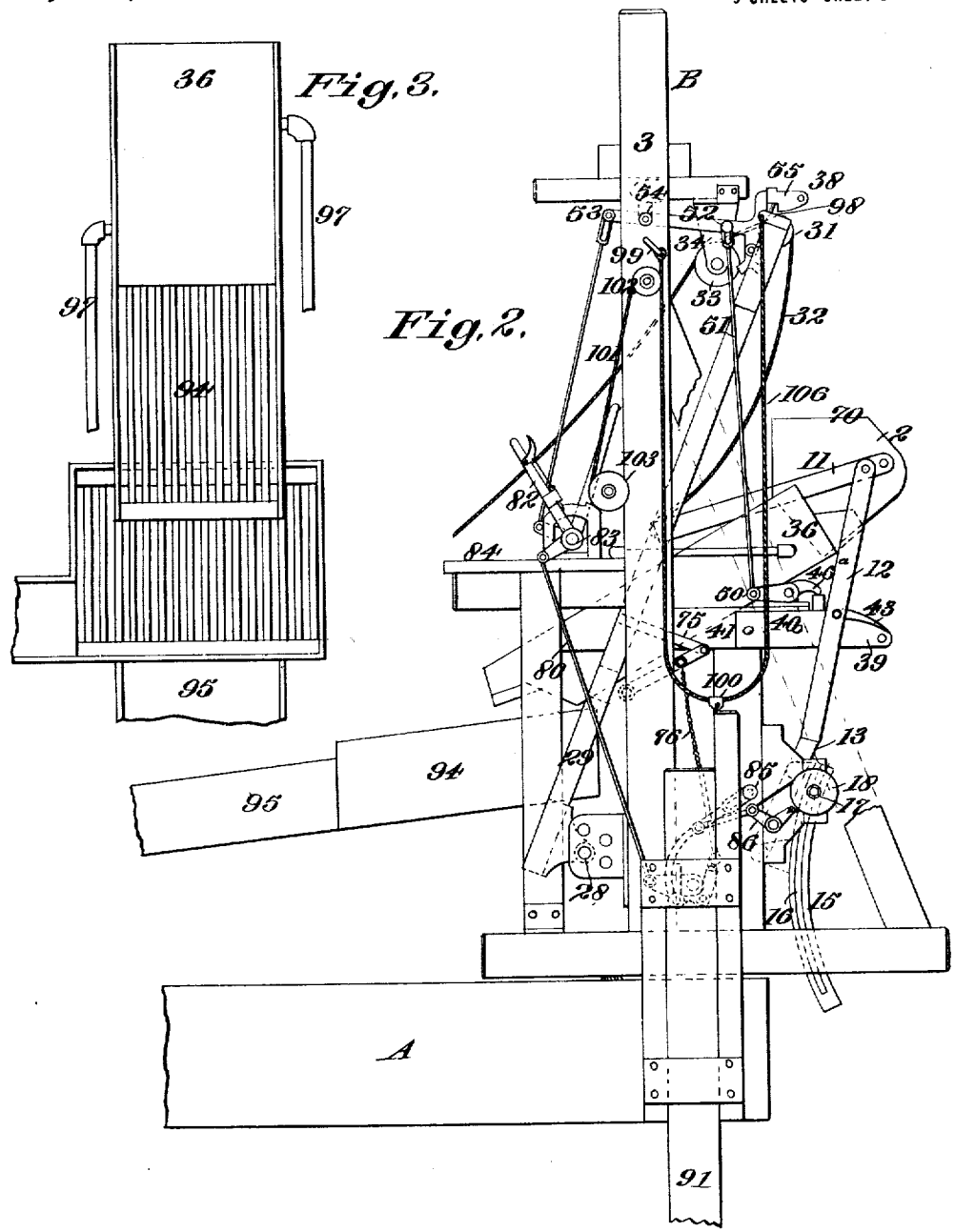

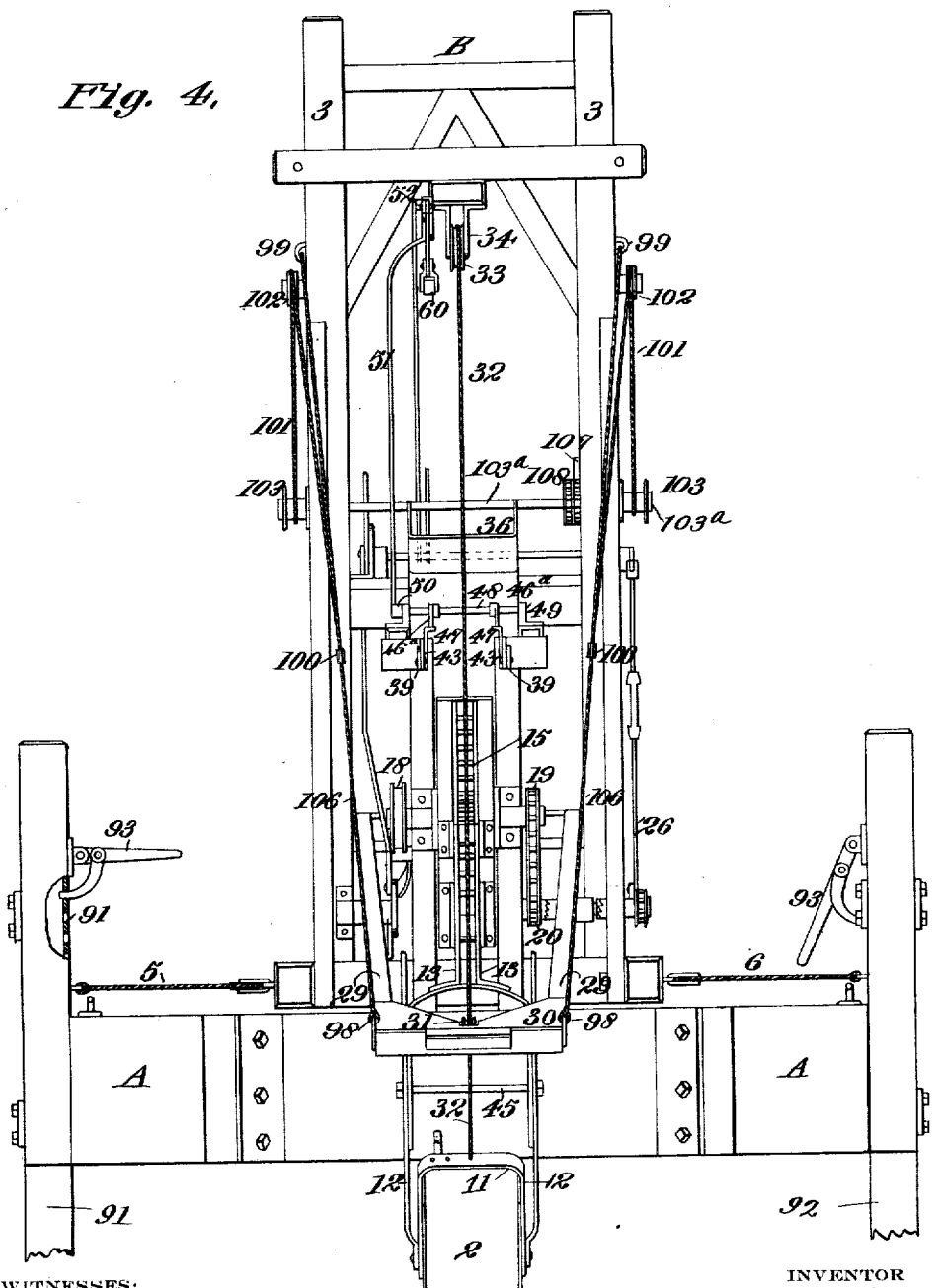

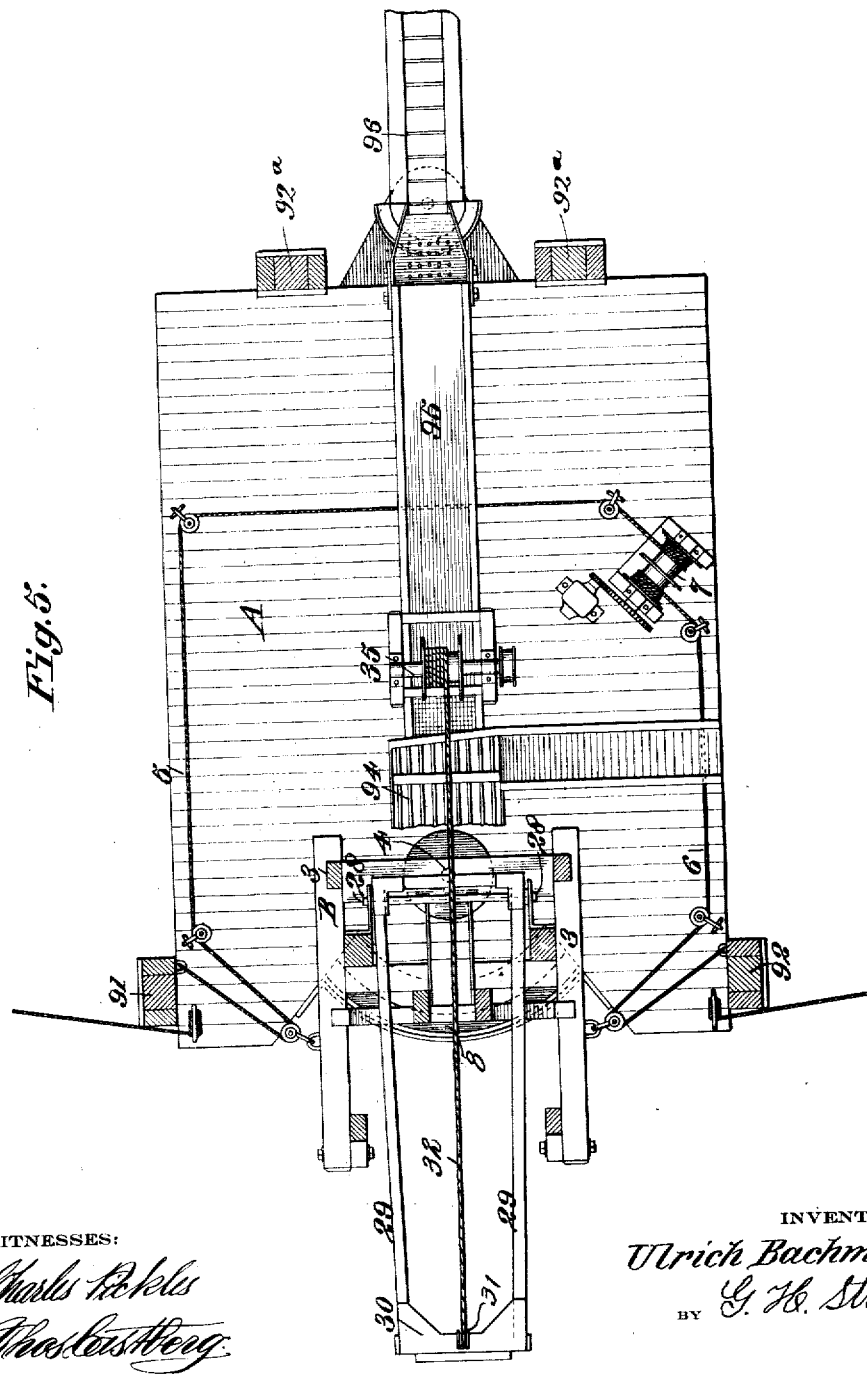

U. BACHMAN.
DREDGER.
APPLICATION FILED NOV. 10, 1914. RENEWED APR. 10, 1918.
1,291,635. Patented Jan. 14, 1919.
9 SHEETS—SHEET 5.
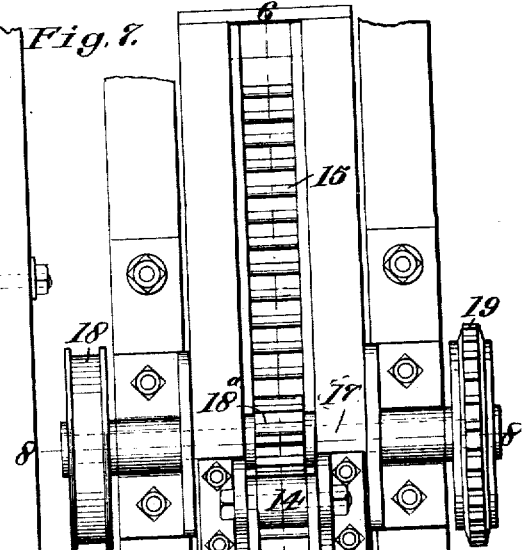
Fig. 7.
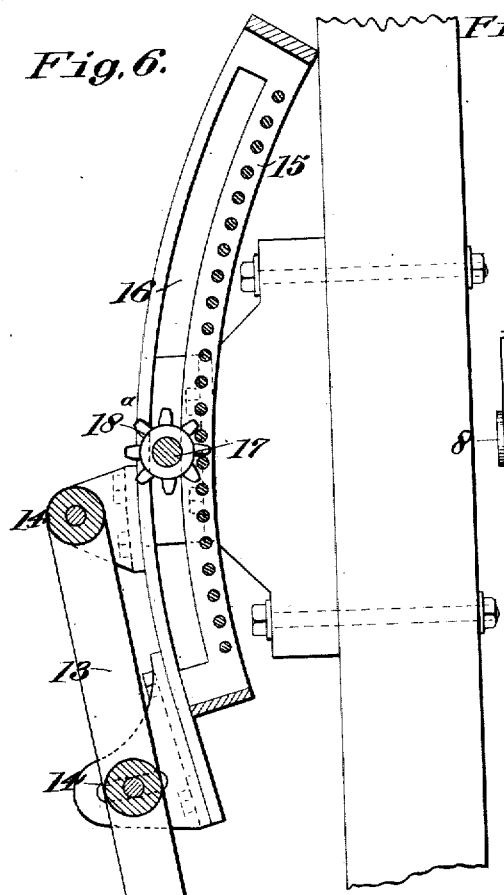
Fig. 6.
Fig. 8.
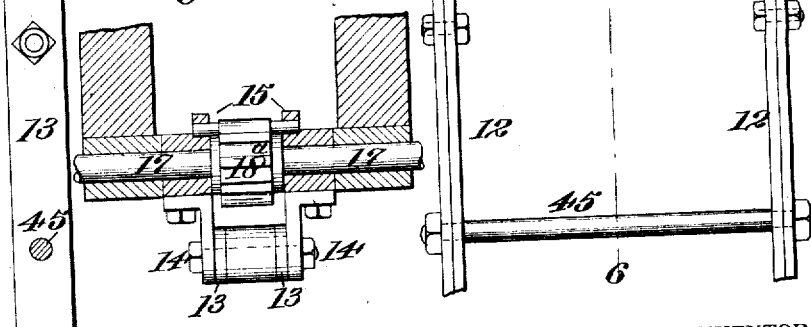
WITNESSES:
Charles Pickles
Thos. Lashberg
INVENTOR
Ulrich Bachman.
BY G. H. Strong
ATTORNEY

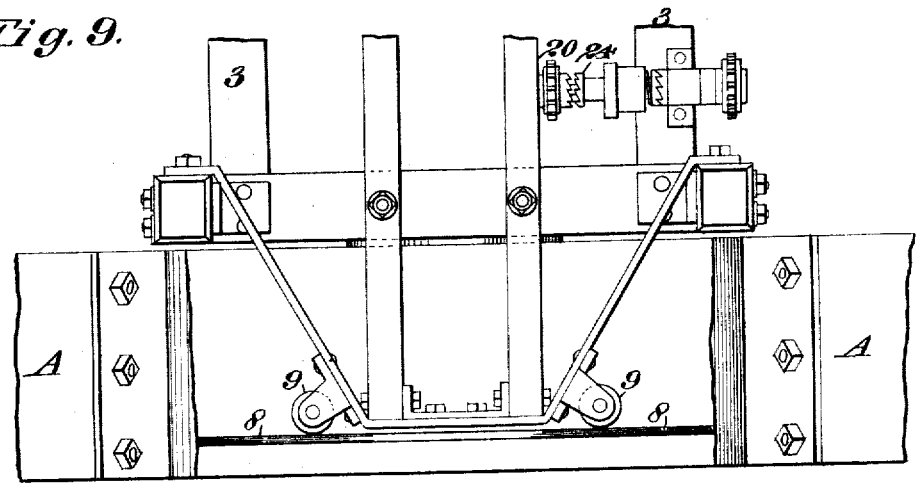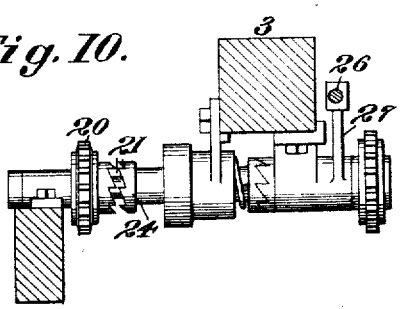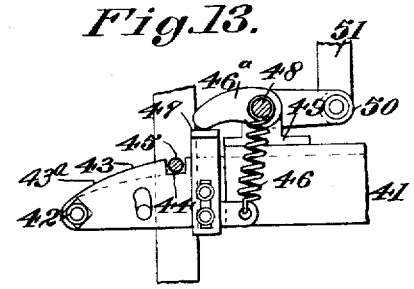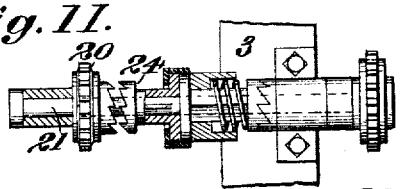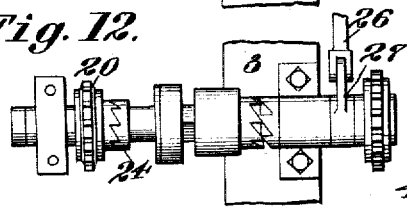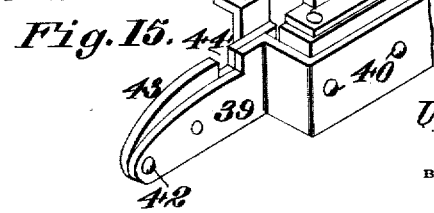

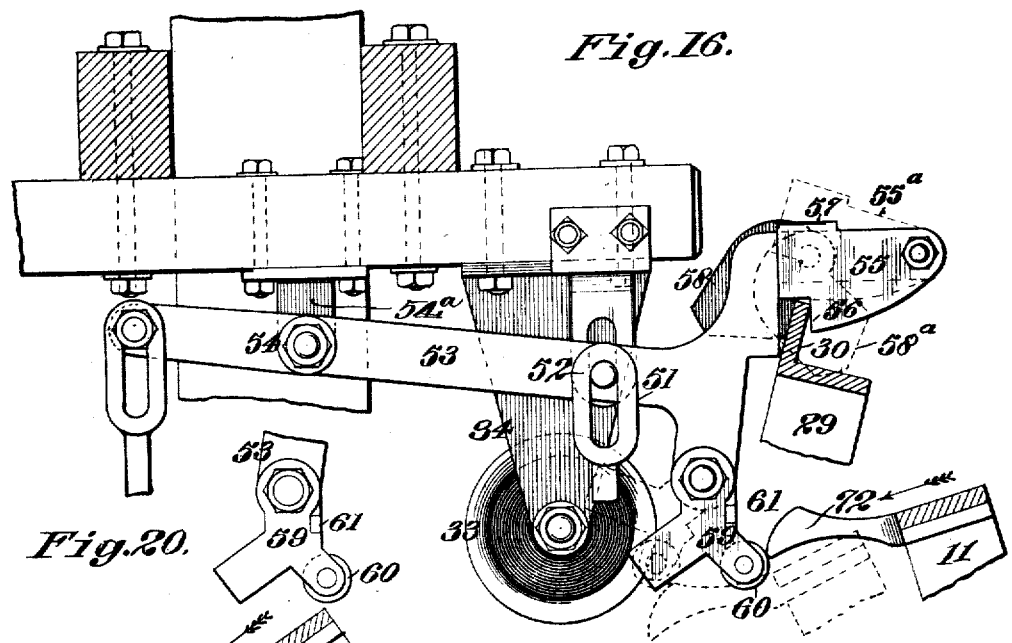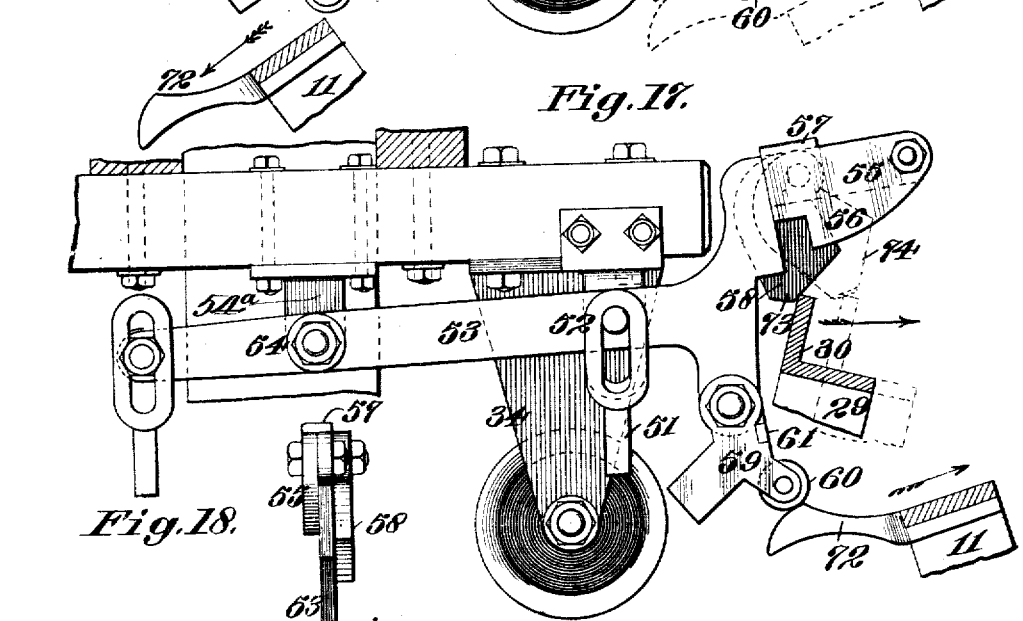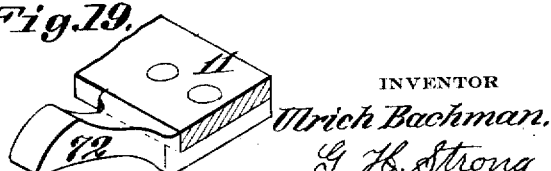

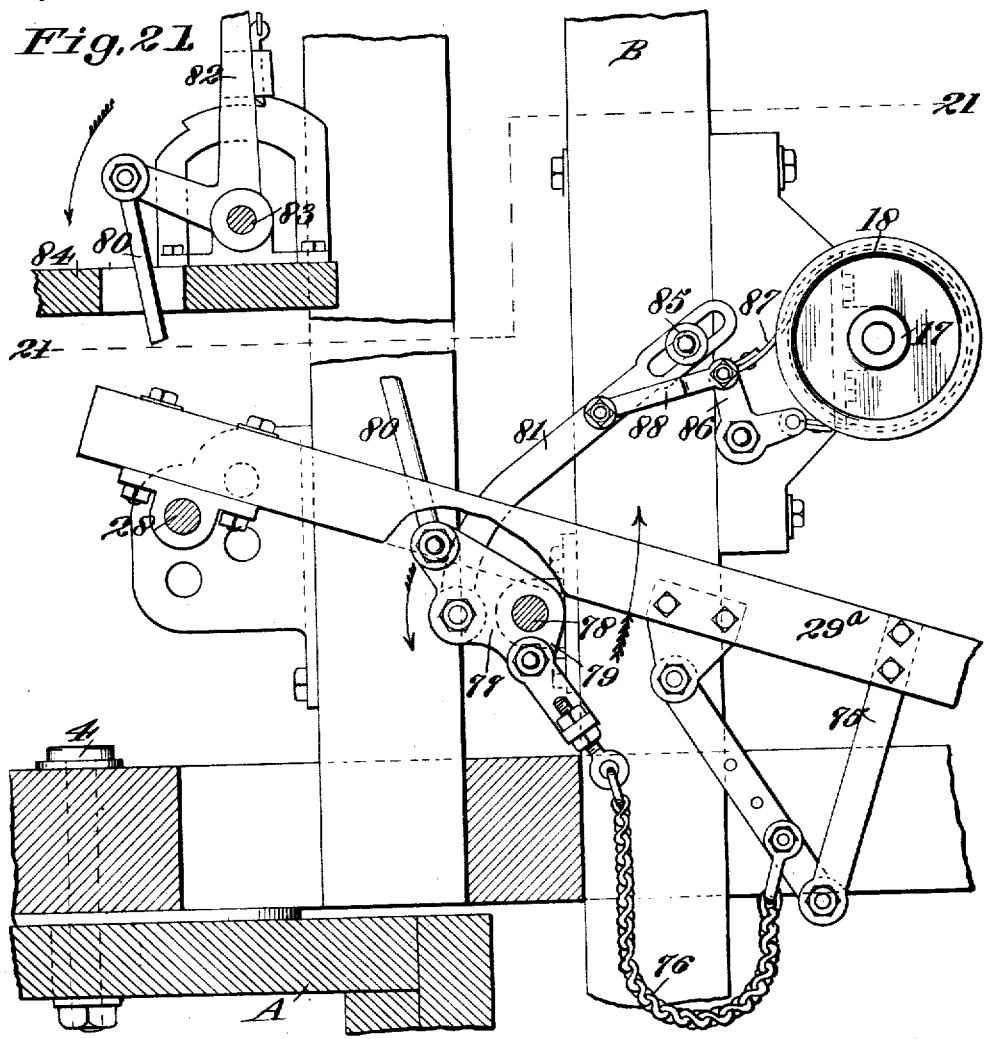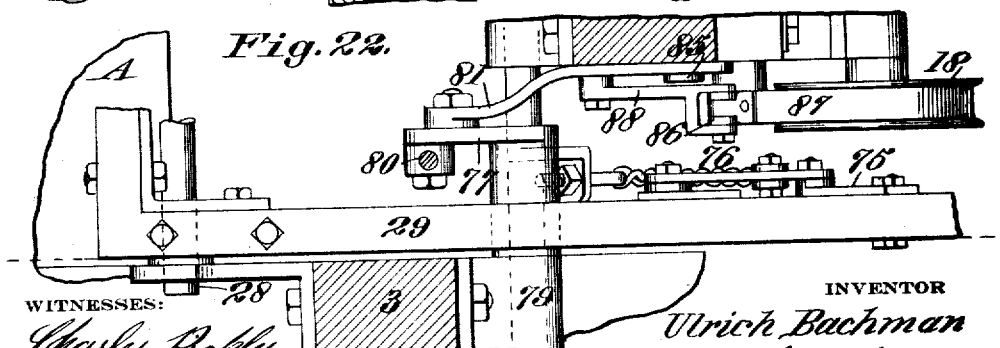

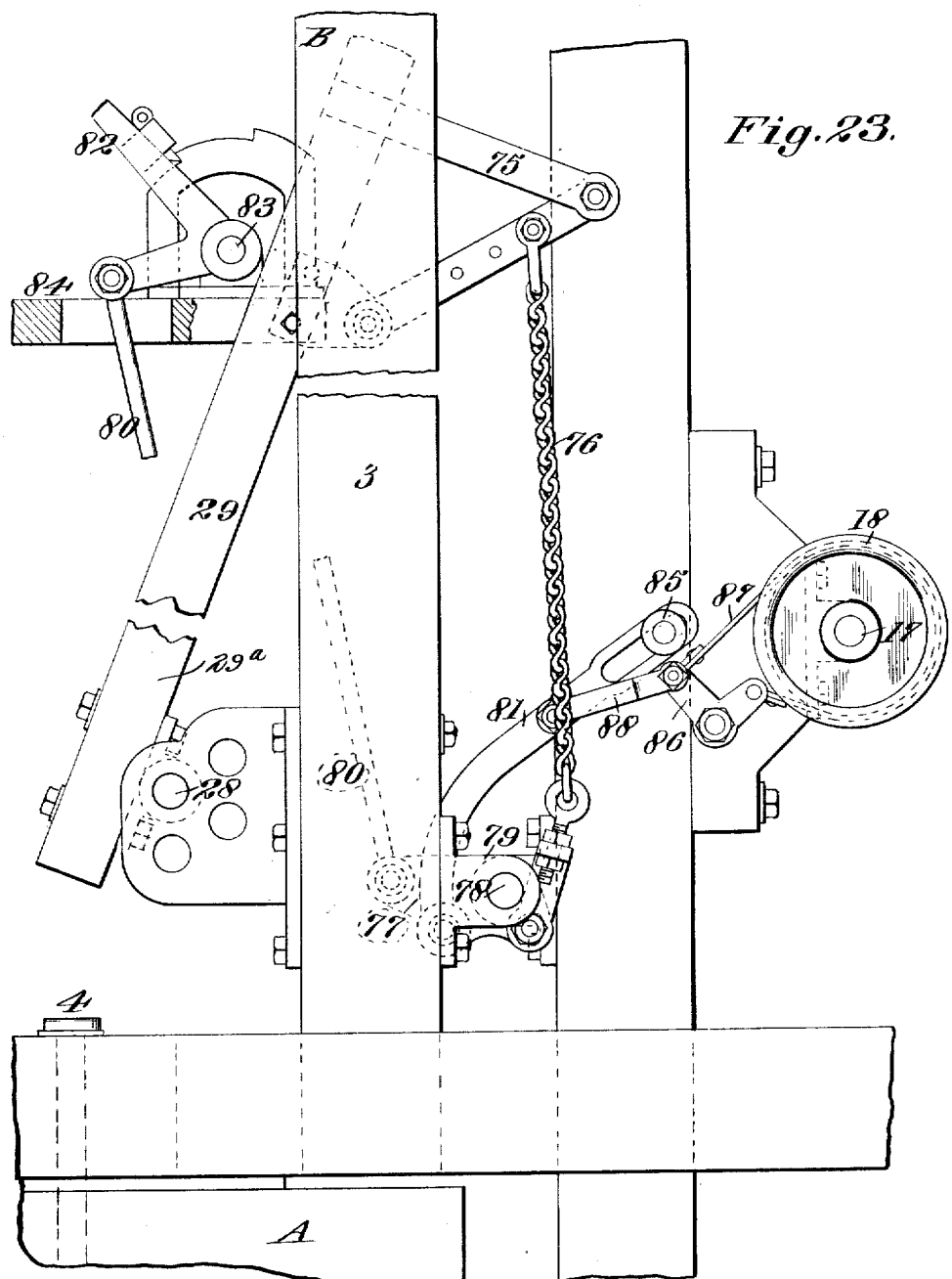

UNITED STATES PATENT OFFICE.

ULRICH BACHMAN, OF SAN FRANCISCO, CALIFORNIA.

DREDGER.

1,291,635.

Specification of Letters Patent. Patented Jan. 14, 1919.

Application filed November 10, 1914, Serial No. 871,277. Renewed April 10, 1918. Serial No. 227,823.

*To all whom it may concern:*

Be it known that I, ULRICH BACHMAN, a citizen of the United States, residing in the city and county of San Francisco and State of California, have invented new and useful Improvements in Dredgers, of which the following is a specification.

This invention relates to a dredger of the shovel type.

One of the objects of the present invention is to provide a dredger of the character described, which is simple, durable and substantial in construction, and which is so designed and assembled that the main operating mechanism may be disconnected into separate pieces or sections for transportation to places which are now practically inaccessible. Another object of the invention is to provide means for swinging the shovel in a horizontal arc when excavating or dredging without swinging or moving the barge. Another object of the invention is to provide a shovel of novel design, together with means for operating same. Further objects will hereinafter appear.

The invention consists of the parts and the construction and combination of parts as hereinafter more fully described and claimed, having reference to the accompanying drawings, in which—

Fig. 2 is a similar view taken from the opposite side of the barge, showing the shovel in the dumping position.

Fig. 3 is a plan view, partly broken away, of the hopper into which the shovel empties.

Fig. 4 is a front elevation of Fig. 1.

Fig. 5 is a plan section on line 5—5, Fig. 1, the shovel with connected operating mechanism being eliminated.

Fig. 6 is a central vertical section on line 6—6, Fig. 7.

Fig. 7 is an enlarged detail front elevation of the upper end of the shovel arm with connected rack and driving mechanism.

Fig. 8 is a plan section on line 8—8, Fig. 7.

Fig. 9 is a partial front elevation of the barge and tower showing the tower support.

Fig. 10 is a plan view of the secondary shaft and the clutch mechanism mounted on same.

Fig. 11 is a front elevation of same partly in section.

Fig. 12 is another front elevation showing the clutch in engaged position.

Fig. 13 is a detail view, in side elevation, of the shovel arm latching mechanism, showing the shovel arm in locked position.

Fig. 14 is a similar view showing the latch depressed and the shovel arm released.

Fig. 15 is a perspective view of the latching mechanism shown in Figs. 13 and 14.

Fig. 16 is an enlarged detail side elevation of the boom latch, showing the upper end of the boom in locked position.

Fig. 17 is a similar view showing the latch raised and the boom in the released position.

Fig. 18 is a front elevation of the boom latch.

Fig. 19 is a perspective of the boom latch releasing cam which is secured upon the upper end of the shovel bail.

Fig. 20 is a detail view showing the relative position of the boom latch releasing cam and the lower end of the boom latch mechanism at a point where the two are just disengaged with relation to each other when the shovel is turning inwardly to dump.

Fig. 21 is an enlarged detail view of the brake drum 18, with connected operating mechanism, showing the boom down and the brake band in the released position.

Fig. 22 is a plan view of same.

Fig. 23 is a view similar to Fig. 1, showing the boom in its upper position where it has actuated the brake drum operating mechanism to lock the brake band.

Figure 1:
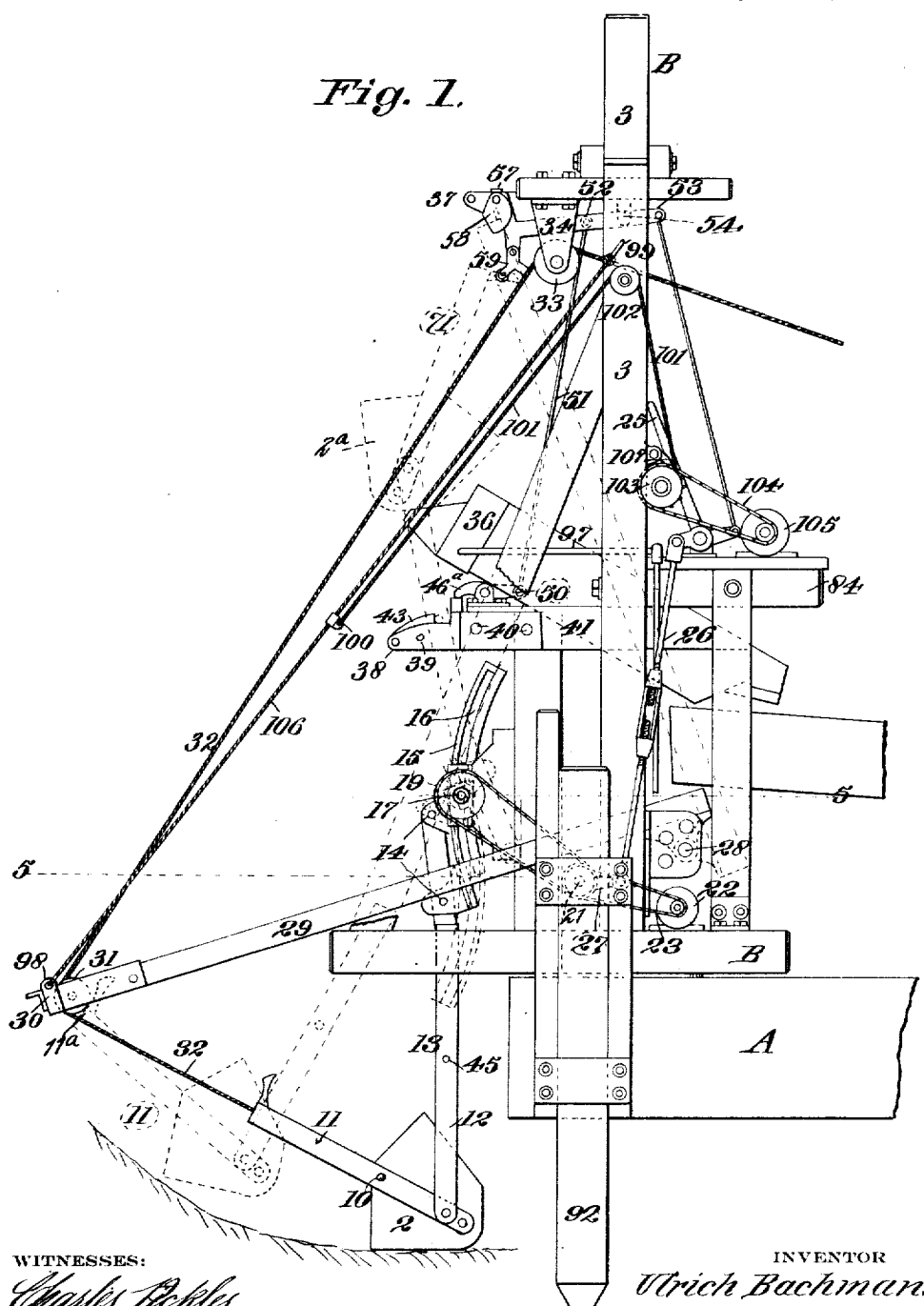
Figure 1 is a side elevation of the front portion of the barge showing the tower, shovel and connected operating mechanism.

More particularly described, A indicates a barge of any suitable construction, on the front end of which is turnably mounted a tower B which supports the shovel 2 with connected operating mechanism. The tower B is constructed of a suitable framework 3, such as is shown in Figs. 1, 2 and 4, and it is adapted to be turned about a central bearing 4 by means of the cables 5 and 6 connected with the side frame of the tower and operated by a motor driven winding drum 7. The tower is otherwise supported by means of a circular track 8 and rollers 9.

Rigidly secured to the shovel, as at 10, is a bail 11, which, together with the shovel, is pivotally mounted in the fork-shaped end 12 of a shovel arm 13. Secured to the upper end of arm 13, as at 14, is a curved rack member 15, the sides of which are turned up and slotted, as at 16 to straddle a power driven bearing shaft 17, upon which is secured a pinion 18ª intermeshing with the rack (see Figs. 1, 6 and 7). Shaft 17 forms a pivotal point about which the shovel arm swings, and power is also transmitted through said shaft to force the shovel into the gravel when excavating.

Secured on one end of shaft 17 is a brake drum 18 for locking the shaft against revolution when the shovel is in a certain position, as will hereinafter be described, and secured on the other end of the shaft is a sprocket wheel 19 which is connected with and driven by a sprocket wheel 20 secured on a secondary shaft 21. This shaft is in turn driven by an electric motor 22 or other source of power by the chain drive indicated at 23. Sprocket wheel 20 is loosely mounted on shaft 21, but may be locked to turn in unison with same by means of the sliding clutch 24 operated by a lever 25 which is connected with the clutch through a link 26 and crank-arm 27.

Pivotally mounted in the tower frame, as at 28, is a boom 29 which consists of a pair of parallel arms, connected at their outer ends by a cross piece or plate 30, in the center of which is journaled a sheave 31. Attached to the upper end of the shovel bail 11 is a cable 32 which passes over the sheave 31 and over a sheave 33 carried by a hanger 34 in the upper portion of the tower. The cable then extends down to a hoisting drum 35 which is driven by any suitable power (not here shown).

The shovel 2 with connected arm 13, together with boom 29 is adapted to be raised into the dotted line position of the boom and shovel indicated in Fig. 1 by means of the hoisting cable 32 for the purpose of swinging the shovel into dumping position with relation to a receiving hopper 36. The boom, together with the shovel arm, is retained in raised position by means of a pair of latches, generally indicated at 37 and 38, when raised into this position.

Referring to the shovel arm retaining latch which is particularly shown in Figs. 13, 14 and 15, the construction will be as follows: 39 indicates a cam-shaped arm which is suitably secured, as at 40, on the outer end of a timber 41 in the tower frame. Pivotally mounted on one side of said cam-shaped arm, as at 42, is a latch member 43 provided with a notch 44 in its upper edge which is adapted to engage with a cross-bar 45 extending across the fork-shaped portion of the shovel arm. Latch 43 is normally held in the position indicated in Figs. 13 and 15 by means of a spring 46 but is depressed latch-fashion to engage with the cross-bar when the shovel arm is turned into the position indicated in Fig. 2. The latch 43 is, however, adapted to be automatically depressed to release the cross-bar when the shovel arm and boom are lowered by a pawl 46ª which engages with an outwardly projecting lug 47 secured upon or formed integral with latch 43.

Pawl 46 is secured upon a short shaft section 48, journaled, as at 49, in suitable bearings in the tower frame, and said shaft is also provided with a crank-arm 50, to which is connected a link 51, the upper end of which is secured, as at 52, to the main arm 53 of the boom latch. The boom latch, more particularly shown in Figs. 16, 17 and 18, consists of the main arm 53, which is pivotally mounted, as at 54, in a hanger 54ª suitably secured in the upper portion of the tower frame. Pivotally mounted in the outer end of the main arm 53 is a latch 55, Fig. 16, the inner end of which is notched, as at 56, to engage with and hold the cross plate 30 of the boom arms 29. Latch 55 is adapted to be raised into the dotted line position indicated at 55ª and is provided with an inwardly turned lug 57 which extends over the top of the main latch arm 53 to prevent the latch from dropping any lower than the position indicated in Fig. 16.

Pivotally mounted on the opposite side of arm 53, with relation to latch 55, is a guard latch 58, the normal position of which is indicated by dotted lines at 58ª Fig. 16 or by full lines in Fig. 17. This guard latch is engaged by the edge of plate 30 when the boom is swung into position where it is engaged by latch 55 and will thus be swung back into the full line position indicated at 58, Fig. 16. The function of the guard latch will be later described.

Pivotally mounted on the lower end of arm 53 is a triangular-shaped link 59, in one arm of which is journaled a roller 60. The opposite arm of the link is simply provided as a counterpoise for the roller 60 so as to hold the link in position against a stop 61 on the arm 53. The function of the pivoted link 59, together with the roller 60, will also be later described.

The operation of the shovel will be as follows: Commencing with the lowermost position of the shovel shown in Fig. 1, the operation of filling the shovel will first be described. Lever 25 is first thrown into position where clutch 24 will be thrown into driving engagement with sprocket wheel 20. Motor 22 is then started and power is transmitted through the driving connection 22 to turn shaft 21. Power is then transmitted through the sprocket 20 to sprocket 19 on shaft 17, causing the pinion 18 to revolve and force the rack, with connected shovel arm and shovel, in a downward direction into the gravel. The hoisting drum 35 is at the same time started, causing the cable 32 to pull the shovel in a forward direction. The shovel is thus forced downward and pulled forward at the same time, causing it to dig into the gravel and fill. A continuous pull on the cable 32 by the hoisting drum will finally bring the shovel into a position where the upper end 11ª of the bail 11 will engage with sheave 31. A connection will thus be made with the boom arms 29 and the shovel and the two will be raised in unison about the boom arm pivot into the upper dotted line position shown in Fig. 1 or the full line position shown in Fig. 2. The moment the uppermost position is reached both the boom arm and the shovel arm will be locked by latches 43 and 55; latch 43 engaging and locking the shovel arm while latch 55 engages with the cross-plate 30 of the boom, holding the same while the shovel is turned into dumping position.

This is accomplished by releasing the winding drum to permit the cable to slacken sufficiently to permit the shovel to turn into the dumping position indicated at 70, Fig. 2. The shovel, when reaching its uppermost position, stands sufficiently tilted, by referring to the position indicated at 71, Fig. 1. to tilt in a forward direction by its own weight when sufficient slack is paid out on the hoisting cable. The weight of the contents of the shovel will thus permit the shovel to drop inwardly and down into the position indicated at 70 where the load is discharged into the hopper 36. The winding drum 35 is again started to raise the shovel into the upright position. In so doing shovel bail 11 will pass in under link 59 of latch arm 53. A cam member 72 will then engage roller 60 and raise the main latch arm 53 into the position indicated in Fig. 17. Latch 55 will thus be raised out of engagement with cross-plate 30 to release the boom. The hoisting drum is again released at this point, permitting the cable to run out and the boom and shovel arm to swing down into digging position.

The guard latch 58 operates at the time that the winding drum is released to permit the boom and shovel to drop. The latch arm 53 would drop right back and cause latch 55 to again engage cross-plate 30 of the boom if the guard latch 58 was not provided. The moment latch arm 53 is raised by the action of cam 72 on the shovel bail, guard latch 58 will swing so that a flat portion 73 on same will engage with the edge of plate 30 (see dotted line position 74, Fig. 17) and hold the latch from temporarily dropping and again engaging the plate until the boom has moved down with relation to latch 55. The upward movement of latch arm 53 is simultaneously transmitted through link 51 to rock shaft 48, causing pawl 46ª on same to depress latch 43, thereby releasing the cross-bar 45 on the shovel arm. The shovel arm and boom are thus released, with relation to their respective holding latches, simultaneously and may both drop or swing down into digging position when thus released.

Shaft 17 is preferably locked against revolution when the boom and shovel arm are raised into their upper position indicated in Fig. 2. This is automatically accomplished in the following manner: Secured to and near the inner end of the right-hand boom arm (see Figs. 22 and 23) 29ª is an extension arm or bracket 75, to which is secured a chain 76. The lower end of said chain is secured to a rocker-arm 77 pivotally mounted, as at 78, in a bearing 79 secured on the tower frame. Connected with the lever arm 77, on the opposite side from the chain connection, is a pair of links 80 and 81. Link 80 is connected to an operating lever 82 pivotally mounted, as at 83, on the operator's platform 84, while the opposite end of link 81 is slotted and slidably mounted on a pin 85 suitably secured on the tower frame. Pivotally mounted with relation to brake drum 18 is a bell-crank lever 86 to which the two ends of the brake drum strap 87 are secured. One end of the bell-crank is connected with link 81 by means of a link 88, and the operation will be as follows: When the boom arm is moved into the upper position indicated in Fig. 23, chain 76 will be moved into a taut position where it will rock lever arm 77. This movement is transmitted through links 81 and 88 to tighten the brake band 87 and lock drum 18, with connected bearing shaft 17, against turning movement. Movement of lever arm 77 will simultaneously be transmitted, through link 80, to move lever 82 on the operator's platform into the position indicated in Fig. 23. The bearing shaft 17, about which the shovel arm swings, is thus automatically locked when the shovel arm and boom are raised into the upper dumping position, and shaft 17 will remain in the locked position until the boom and shovel are lowered into digging position. Shaft 17 is then unlocked by releasing lever 82 and throwing it into the position indicated in Fig. 21. Shaft 17 is thus unlocked by reason of the slackening of the strap 87 on drum 18 and the shovel is thus permitted to drop down to the bottom where it is forced into the gravel the moment clutch 24 is thrown in by lever 25 to transmit power to shaft 17, which in turn is transmitted through pinion 18ª and rack 15 to force or drive the shovel downwardly into the gravel.

The turnable mounting of the tower permits the shovel to be swung in a circle without moving the barge and the barge may furthermore be steadied by a pair of forward spuds 91 and 92 which are dropped down into the locked position by means of the mechanism indicated at 93. A pair of spuds 92ª of the usual construction are provided at the rear end of the barge to further secure it in position when excavation is taking place.

Where a dredger of the character described is used for placer mining, it is only necessary to connect hopper 36 with a grizzly 94 of the usual construction, which in turn is connected with a string of sluice boxes 95 and a tailing elevator 96, water being supplied in any suitable manner by means of pipes 97, as indicated in Fig. 3. The dredger may, however, be used for any suitable purpose and the hopper may thus be connected with any suitable means for disposing of the material elevated by the shovel.

Dredgers of the continuous bucket type, such as are commonly used today, have to turn bodily around right and left in order to keep open space for themselves when working ahead. They, therefore, sometimes have to handle very much ground on both sides of the metal bearing streak that does not contain any minerals at all. The form of dredger shown in the present instance does not handle any more ground than is required for the passing of the barge straight ahead, as the sweep of the shovel mounted on the swinging tower permits a scoop wider than the barge. Considerably less waste ground or material is thus handled.

Most of the standard forms of dredgers now used contain much larger and more complicated machinery than the dredger shown in the present invention. They, therefore, require more power for operation, are subject to greater wear and tear with consequent break downs, are more costly to construct and transport, and furthermore need skilful operators for efficient handling. The dredger shown in the present case is constructed of parts which can be easily assembled or disconnected into parts or sections so small that they may often be loaded on mule back for transportation to places heretofore practically inaccessible. The dredger can thus be cheaply constructed and the life and efficiency of same is greatly increased in proportion to the output.

Means are provided on the present dredger for adjusting the lower position of the boom 29. This is of considerable importance, especially when stripping off the top soil or covering of the "pay streak" which does not contain sufficient values to be passed through the sluice boxes in the usual manner.

The adjustment of the boom 29 is obtained in the following manner: Secured to the outer end of the boom, as at 98, is a cable 106, the upper end of which is secured, as at 99, to the tower. Suitably secured to this cable at 100 is a hoisting cable 101 which passes over a sheave 102. It is then attached to a winding drum 103 which may be operated in any suitable manner, or, as here shown, by a driving connection 104 operated by a motor 105.

When handling or removing the upper layers of soil it is only necessary to raise the boom 29 by the hoisting cables just described into the desired position. The shovel can thus be raised and lowered from the boom end and will then easily remove the soil without digging into the mineral bearing earth. After the top soil or covering has been removed it is only necessary to lower the boom into the lowermost position indicated in Fig. 1 which is limited by cable 106, or lowering it into any other desired position from which the shovel may be most conveniently handled; a pawl 107 engageable with a ratchet wheel 108 secured on the winding drum shaft being provided to support the boom in the adjusted position. The winding drum shaft 103ª extends clear across the frame, as indicated in Fig. 4, and is provided with a drum on each end, there being a double set of supporting and hoisting cables.

The materials and finish of the several parts of the dredger are such as the experience and judgment of the manufacturer may dictate.

I wish it understood that various changes in form, proportions and minor details of construction may be resorted to within the scope of the appended claims and that I do not wish to limit myself to the specific design and construction here shown.

Having thus described my invention, what I claim and desire to secure by Letters Patent is—

1. A dredger comprising a barge, a tower mounted on said barge, a power driven bearing shaft journaled in the tower, a shovel arm carried at its upper end by said shaft, a shovel pivotally mounted in the lower end of the shovel arm, a boom pivotally mounted at its inner end on the tower, means for raising the shovel and boom in unison to a substantially vertical position, means for locking the boom and shovel arm in this position, and means for tilting the shovel in the shovel arm to dumping position while the boom and shovel arm are locked.

2. A dredger comprising a barge, a tower mounted on said barge, a power driven bearing shaft journaled in the tower, a shovel arm carried at its upper end by said shaft, a shovel pivotally mounted in the lower end of the shovel arm, a boom pivotally mounted at its inner end on the tower, means for raising the shovel and boom in unison to a substantially vertical position, means for locking the boom and shovel arm in this position, means for tilting the shovel in the shovel arm to dumping position while the boom and shovel arm are locked, and means for automatically releasing the boom and shovel arm locking mechanism.

3. A dredger comprising a barge, a tower mounted on said barge, a power driven bearing shaft journaled in the tower, a shovel arm carried at its upper end by said shaft, a shovel pivotally mounted in the lower end of the shovel arm, a boom pivotally mounted at its inner end on the tower, means for raising the shovel and boom in unison to a substantially vertical position, means for locking the boom and shovel arm in this position, means for tilting the shovel in the shovel arm to dumping position while the boom and shovel arm are locked, and means controlled by the return movement of the shovel after this is dumped for releasing the boom and shovel arm locking means.

4. A dredger comprising a barge, a tower mounted on said barge, a power driven bearing shaft journaled in the tower, a gear pinion secured on said shaft, a rack member intermeshing with said pinion, a shovel arm secured to the rack member, a shovel pivotally mounted in the lower end of said shovel arm, a boom pivotally mounted at its inner end on the tower, means for transmitting power to the bearing shaft to drive the shovel in a downward direction when the boom is in its lowered position, means for simultaneously swinging the shovel forward with relation to the boom, said means also adapted to swing the boom and shovel in unison into a substantially vertical elevated position, means for locking the boom and shovel arm in this position, and means for dumping the shovel while the boom and shovel arm are locked.

5. A dredger comprising a barge, a tower mounted on said barge, a power driven bearing shaft journaled in the tower, a gear member pinion secured on said shaft, a rack member intermeshing with said pinion, a shovel arm secured to the rack member, a shovel pivotally mounted in the lower end of said shovel arm, a boom pivotally mounted at its inner end on the tower, means for transmitting power to the bearing shaft to drive the shovel in a downward direction when the shovel in a downward direction when the boom is in its lowered position, means for simultaneously swinging the shovel forward with relation to the boom, said means also adapted to swing the boom and shovel in unison into a substantially vertical elevated position, means for locking the boom and shovel arm in this position, means for dumping the shovel while the boom and shovel arm are locked, and means for automatically releasing the boom and shovel arm locking means after the shovel is dumped.

6. A dredger comprising a barge, a tower mounted on said barge, a power driven bearing shaft journaled in the tower, a gear pinion secured on said shaft, a rack member intermeshing with said pinion, a shovel arm secured to the rack member, a shovel pivotally mounted in the lower end of said shovel arm, a boom pivotally mounted at its inner end on the tower, means for adjusting the lowered position of said boom, means for transmitting power to the bearing shaft to drive the shovel in a downward direction when the boom is in its lowered position, means for simultaneously swinging the shovel forward with relation to the boom, said means also adapted to swing the boom and shovel in unison into a substantially vertical elevated position, a latch engageable with the boom to lock and retain same in the elevated position, a second latch engageable with the shovel arm to lock and retain same in the elevated position, and means for dumping the shovel while the boom and shovel arm are locked.

7. A dredger comprising a barge, a tower mounted on said barge, a power driven bearing shaft journaled in the tower, a gear pinion secured on said shaft, a rack member intermeshing with said pinion, a shovel arm secured to the rack member, a shovel pivotally mounted in the lower end of said shovel arm, a boom pivotally mounted at its inner end on the tower, means for adjusting the lowered position of said boom, means for transmitting power to the bearing shaft to drive the shovel in a downward direction when the boom is in its lowered position, means for simultaneously swinging the shovel forward with relation to the boom, said means also adapted to swing the boom and shovel in unison into a substantially vertical elevated position, a latch engageable with the boom to lock and retain same in the elevated position, a second latch engageable with the shovel arm to lock and retain same in the elevated position, means for dumping the shovel while the boom and shovel arm are locked, and means for automatically releasing the boom and shovel arm retaining latches when the shovel has been dumped.

8. A dredger comprising a barge, a tower mounted on said barge, a power driven bearing shaft journaled in the tower, a gear pinion secured on said shaft, a rack member intermeshing with said pinion, a shovel arm secured to the rack member, a shovel pivotally mounted in the lower end of said shovel arm, a boom pivotally mounted at its inner end on the tower, means for adjusting the lowered position of said boom, means for transmitting power to the bearing shaft to drive the shovel in a downward direction when the boom is in its lowered position, means for simultaneously swinging the shovel forward with relation to the boom, said means also adapted to swing the boom and shovel in unison into a substantially vertical elevated position, a latch engageable with the boom to lock and retain same in the elevated position, a second latch engageable with the shovel arm to lock and retain same in the elevated position, means for dumping the shovel while the boom and shovel arm are locked, means for automatically releasing the boom and shovel arm retaining latches when the shovel has been dumped, said means comprising a bail arm secured to the shovel, a cam secured to the outer end of the bail arm which is engageable with the boom latch to raise same, and a link connecting the boom latch with the shovel arm latch to simultaneously raise same to release the shovel arm.

9. A dredger comprising a barge, a tower mounted on said barge, a power driven bearing shaft journaled in the tower, a gear pinion secured on said shaft, a rack member intermeshing with said pinion, a shovel arm secured to the rack member, a shovel pivotally mounted in the lower end of said shovel arm, a boom pivotally mounted at its inner end on the tower, means for transmitting power to the bearing shaft to drive the shovel in a downward direction when the boom is in its lowered position, means for simultaneously swinging the shovel forward with relation to the boom, said means also adapted to swing the boom and shovel in unison into a substantially vertical elevated position, means for locking the boom and shovel arm in this position, means for dumping the shovel while the boom and shovel arm are locked, and means for turning the tower to swing the boom and shovel in a horizontal arc.

10. A dredger comprising a barge, a tower mounted on said barge, a power driven bearing shaft journaled in the tower, a gear pinion secured on said shaft, a rack member intermeshing with said pinion, a shovel arm secured to the rack member, a shovel pivotally mounted in the lower end of said shovel arm, a boom pivotally mounted at its inner end on the tower, means for transmitting power to the bearing shaft to drive the shovel in a downward direction when the boom is in its lowered position, means for simultaneously swinging the shovel forward with relation to the boom, said means also adapted to swing the boom and shovel in unison into a substantially vertical elevated position, means for locking the boom and shovel arm in this position, means for dumping the shovel while the boom and shovel arm are locked, means for automatically releasing the boom and shovel arm locking means after the shovel is dumped, and means for turning the tower to swing the boom and shovel in a horizontal arc.

11. A dredger comprising a barge, a tower mounted on said barge, a power driven bearing shaft journaled in the tower, a gear pinion secured on said shaft, a rack member intermeshing with said pinion, a shovel arm secured to the rack member, a shovel pivotally mounted in the lower end of said shovel arm, a boom pivotally mounted at its inner end on the tower, means for adjusting the lowered position of said boom, means for transmitting power to the bearing shaft to drive the shovel in a downward direction when the boom is in its lowered position, means for simultaneously swinging the shovel forward with relation to the boom, said means also adapted to swing the boom and shovel in unison into a substantially vertical elevated position, a latch engageable with the boom to lock and retain same in the elevated position, a second latch engageable with the shovel arm to lock and retain same in the elevated position, means for dumping the shovel while the boom and shovel arm are locked, and means for turning the tower to swing the boom and shovel in a horizontal arc.

12. A dredger comprising a barge, a tower mounted on said barge, a power driven bearing shaft journaled in the tower, a gear pinion secured on said shaft, a rack member intermeshing with said pinion, a shovel arm secured to the rack member, a shovel pivotally mounted in the lower end of said shovel arm, a boom pivotally mounted at its inner end on the tower, means for adjusting the lowered position of said boom, means for transmitting power to the bearing shaft to drive the shovel in a downward direction when the boom is in its lowered position, means for simultaneously swinging the shovel forward with relation to the boom, said means also adapted to swing the boom and shovel in unison into a substantially vertical elevated position, a latch engageable with the boom to lock and retain same in the elevated position, a second latch engageable with the shovel arm to lock and retain same in the elevated position, means for dumping the shovel while the boom and shovel arm are locked, means for automatically releasing the boom and shovel arm retaining latches when the shovel has been dumped, and means for turning the tower to swing the boom and shovel in a horizontal arc.

13. A dredger comprising a barge, a tower mounted on said barge, a power driven bearing shaft journaled in the tower, a gear pinion secured on said shaft, a rack member intermeshing with said pinion, a shovel arm secured to the rack member, a shovel pivotally mounted in the lower end of said shovel arm, a boom pivotally mounted at its inner end on the tower, means for transmitting power to the bearing shaft to drive the shovel in a downward direction when the boom is in its lowered position, means for simultaneously swinging the shovel forward with relation to the boom, said means also adapted to swing the boom and shovel in unison into a substantially vertical elevated position, means for locking the boom and shovel arm in this position, means for locking the bearing shaft against revolution to support the shovel arm in the elevated position, and means for dumping the shovel while the boom and shovel arm are elevated and locked.

14. A dredger comprising a barge, a tower mounted on said barge, a power driven bearing shaft journaled in the tower, a gear pinion secured on said shaft, a rack member intermeshing with said pinion, a shovel arm secured to the rack member, a shovel pivotally mounted in the lower end of said shovel arm, a boom pivotally mounted at its inner end on the tower, means for transmitting power to the bearing shaft to drive the shovel in a downward direction when the boom is in its lowered position, means for simultaneously swinging the shovel forward with relation to the boom, said means also adapted to swing the boom and shovel in unison into a substantially vertical elevated position, means for locking the boom and shovel arm in this position, means for automatically locking the bearing shaft against revolution to support the shovel arm in the elevated position, and means for dumping the shovel while the boom and shovel arm are elevated and locked.

15. A dredger comprising a barge, a tower mounted on said barge, a power driven bearing shaft journaled in the tower, a gear pinion secured on said shaft, a rack member intermeshing with said pinion, a shovel arm secured to the rack member, a shovel pivotally mounted in the lower end of said shovel arm, a boom pivotally mounted at its inner end on the tower, means for transmitting power to the bearing shaft to drive the shovel in a downward direction when the boom is in its lowered position, means for simultaneously swinging the shovel forward with relation to the boom, said means also adapted to swing the boom and shovel in unison into a substantially vertical elevated position, means for locking the boom and shovel arm in this position, means for automatically locking the bearing shaft against revolution to support the shovel arm in the elevated position, means for dumping the shovel while the boom and shovel arm are elevated and locked, and means for manually releasing said bearing shaft locking means when the shovel and boom are lowered.

16. A dredger comprising a barge, a tower mounted on said barge, a power driven bearing shaft journaled in the tower, a gear pinion secured on said shaft, a rack member intermeshing with said pinion, a shovel arm secured to the rack member, a shovel pivotally mounted in the lower end of said shovel arm, a boom pivotally mounted at its inner end on the tower, means for adjusting the lowered position of said boom, means for transmitting power to the bearing shaft to drive the shovel in a downward direction when the boom is in its lowered position, means for simultaneously swinging the shovel forward with relation to the boom, said means also adapted to swing the boom and shovel in unison into a substantially vertical elevated position, a latch engageable with the boom to lock and retain same in the elevated position, a second latch engageable with the shovel arm to lock and retain same in the elevated position, means for dumping the shovel while the boom and shovel arm are locked, a brake drum secured on the bearing shaft, and means connected with the boom for automatically locking same when the boom is turned to elevated position.

17. A dredger comprising a barge, a tower mounted on said barge, a power driven bearing shaft journaled in the tower, a gear pinion secured on said shaft, a rack member intermeshing with said pinion, a shovel arm secured to the rack member, a shovel pivotally mounted in the lower end of said shovel arm, a boom pivotally mounted at its inner end on the tower, means for adjusting the lowered position of said boom, means for transmitting power to the bearing shaft to drive the shovel in a downward direction when the boom is in its lowered position, means for simultaneously swinging the shovel forward with relation to the boom, said means also adapted to swing the boom and shovel in unison into a substantially vertical elevated position, a latch engageable with the boom to lock and retain same in the elevated position, a second latch engageable with the shovel arm to lock and retain same in the elevated position, means for dumping the shovel while the boom and shovel arm are locked, a brake drum secured on the bearing shaft, means connected with the boom for automatically locking same when the boom is turned to elevated position, and means for automatically releasing the boom and shovel arm retaining latches when the shovel has been dumped.

18. In a dredger, a frame, a drive pinion spaced outwardly therefrom, a curved rack bar having its concave side facing the frame and its convex side meshing with the pinion, a shovel, and a shovel arm pivoted to the rack bar at a point between the ends of the latter.

19. A dredger comprising a barge, a tower on the barge, a bearing shaft in the tower, a shovel arm pivotally and reciprocally mounted on the shaft, a shovel pivotally mounted on the shovel arm, a bail on the shovel, a boom pivotally mounted at its inner end on the tower, means attached to the shovel bail to raise the shovel and connected arm with relation to the boom, said means also adapted to raise the shovel and boom in unison to a position where the shovel and bail will assume a position beyond a vertical line, means for locking the shovel arm and boom in said position, and means for tilting the shovel while the boom and shovel arm are locked.

20. A dredger comprising a barge, a tower on the barge, a bearing shaft in the tower, a shovel arm pivotally and reciprocally mounted on the shaft, a shovel pivotally mounted on the shovel arm, a bail on the shovel, a boom pivotally mounted at its inner end on the tower, means attached to the shovel bail to raise the shovel and connected arm with relation to the boom, said means also adapted to raise the shovel and boom in unison to a position where the shovel and bail will assume a position beyond a vertical line, means for locking the shovel arm and boom in said position, means for tilting the shovel while the boom and shovel arm are locked, said means also adapted to raise the shovel back to a substantially vertical position, and means actuated by the raising of the shovel for releasing the boom and shovel arm locking means.

21. A dredger comprising a barge, a tower on the barge, a bearing shaft in the tower, a shovel arm pivotally and reciprocally mounted on the shaft, a shovel pivotally mounted on the shovel arm, a bail on the shovel, a boom pivotally mounted at its inner end on the tower, means attached to the shovel bail to raise the shovel and connected arm with relation to the boom, said means also adapted to raise the shovel and boom in unison to a position where the shovel and bail will assume a position beyond a vertical line, a latch member engageable with the boom to lock same in its upper position, a latch member engageable with the shovel arm to lock same in its upper position, and means for tilting the shovel to dump the contents while the boom and shovel arm are held by the latches.

22. A dredger comprising a barge, a tower on the barge, a bearing shaft in the tower, a shovel arm pivotally and reciprocally mounted on the shaft, a shovel pivotally mounted on the shovel arm, a bail on the shovel, a boom pivotally mounted at its inner end on the tower, means attached to the shovel bail to raise the shovel and connected arm with relation to the boom, said means also adapted to raise the shovel and boom in unison to a position where the shovel and bail will assume a position beyond a vertical line, a latch member engageable with the boom to lock same in its upper position, a latch member engageable with the shovel arm to lock same in its upper position, means for tilting the shovel to dump the contents while the boom and shovel arm are held by the latches, said means also adapted to raise the shovel back to a substantially vertical position, means connecting the two latches whereby they may be raised in unison, and means mounted on the shovel engageable with said means to raise the latches and release the arms when the shovel is raised.

23. In a dredger, a frame, a drive pinion spaced outwardly therefrom, a curved rack bar having its concave side facing the frame and its convex side meshing with the pinion, a shovel, a bracket extending outwardly from the convex side of the bar, and a shovel arm pivoted to the bracket.

24. In a dredger, a frame, a drive pinion spaced outwardly therefrom, a curved rack bar having its concave side facing the frame and its convex side meshing with the pinion, a shovel, a bracket extending outwardly from the convex side of the bar at a point intermediate the terminals of the bar, a slotted bracket at one terminal of the bar, and a shovel arm pivoted to the first bracket and having sliding engagement with the slotted bracket.

25. In a dredger, the combination with a tower, of a power driven bearing shaft journaled in the tower, a shovel arm, a shovel pivotally mounted in the lower end of the arm, a curved rack bar secured on the upper end of the shovel arm, the curve of said rack bar being struck from a center which is positioned on the same side as the center of the pitch line of the gear with which the rack bar intermeshes, a gear secured on the shaft with which the curved rack bar intermeshes, a boom pivotally mounted in the tower, and means attached to the shovel to raise and swing the shovel about the shaft from a plane below to a plane above the shaft, a shovel arm and rack bar about the shaft, said means also adapted to raise the boom.

26. In a dredger, the combination with a tower, of a power driven bearing shaft journaled in the tower, a shovel arm, a shovel pivotally mounted in the lower end of the arm, a curved rack bar secured on the upper end of the shovel arm, a gear secured on the shaft with which the curved rack bar intermeshes, a boom pivotally mounted in the tower, means attached to the shovel to raise and swing the shovel, shovel arm and rack bar about the shaft, said means also adapted to raise the boom in unison with the shovel, shovel arm and rack bar until a position is reached where the shovel assumes a position just beyond a vertical line, and means for locking the boom and shovel arm in said position.

27. In a dredger, a supporting structure, a shovel arm pivoted thereon, a shovel pivoted to the arm, means for swinging the shovel and arm to dumping position, a lock for holding the arm during the dumping of the shovel, said shovel dumping when said means is released, and means operable by righting the shovel to unlock the shovel arm.

28. In a dredger, a supporting structure, a shaft journaled thereon, a gear on the shaft, a rack meshing with the gear, a shovel carried by the rack, a manually releasable brake for the shaft operable when the shovel is in dumping position, means to lock the rack when the shovel is in dumping position, and means for moving the shovel to dumping position and automatically applying the brake.

29. In a dredger, a supporting structure, a shaft journaled thereon, a gear on the shaft, a rack meshing with the gear, a shovel carried by the rack, a manually releasable brake for the shaft operable when the shovel is in dumping position, means to lock the rack when the shovel is in dumping position, means for moving the shovel to dumping position and simultaneously applying the brake and lock means, and other means for automatically releasing the lock means.

30. In a dredger, a support, a boom pivoted thereon, a lock for holding the boom inoperative, a shovel arm pivoted on the support, a shovel pivoted to the arm, a lock for holding the shovel arm in dumping position, means for moving the arm and boom to be engaged by their respective locks, said means when released permitting of the shovel dumping and when again actuated righting the shovel, and means operable by the shovel when righting from dumping position to release the locks.

31. In a dredger, a support, a power driven shaft thereon, a pinion fixed on the shaft, a shovel, a shovel arm supporting the shovel for swinging from normal position below the shaft to a dumping position above the shaft, a curved rack bar secured to the shovel arm and meshing with the pinion, said pinion engaging at the upper end of the rack bar when the shovel is in dumping position, and means for swinging the shovel and arm about the shaft to dumping position.

In testimony whereof I have hereunto set my hand in the presence of two subscribing witnesses.

ULRICH BACHMAN.

Witnesses:
JOHN H. HERRING,
W. W. HEALEY.

Copies of this patent may be obtained for five cents each, by addressing the "Commissioner of Patents, Washington, D. C."